(12) United States Patent
Powell (10) Patent No.: US 12,407,688 B2
(45) Date of Patent: Sep. 2, 2025

(54) END-TO-END ENCRYPTION WITH PASSWORD ACCESS

(71) Applicant: Cisco Technology, Inc., San Jose, CA (US)

(72) Inventor: Brian C. Powell, El Segundo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 792 days.

(21) Appl. No.: 17/667,021

(22) Filed: Feb. 8, 2022

(65) Prior Publication Data

US 2023/0254313 A1    Aug. 10, 2023

(51) Int. Cl.
*H04L 9/40*    (2022.01)

(52) U.S. Cl.
CPC .......... *H04L 63/101* (2013.01); *H04L 63/061* (2013.01); *H04L 63/083* (2013.01)

(58) Field of Classification Search
CPC ... H04L 63/101; H04L 63/061; H04L 63/083; H04L 63/0428; H04L 2463/062
See application file for complete search history.

(56) References Cited

U.S. PATENT DOCUMENTS

| 6,947,556 | B1* | 9/2005 | Matyas, Jr. | ........... | H04L 9/3213 380/43 |
| 2004/0243851 | A1* | 12/2004 | Lee | ....................... | H04L 63/101 726/4 |
| 2009/0193030 | A1* | 7/2009 | Gorsev | ............... | G06F 16/9577 |
| 2014/0019498 | A1* | 1/2014 | Cidon | ................... | G06F 16/182 707/827 |
| 2014/0031074 | A1* | 1/2014 | Sato | ....................... | H04L 63/083 455/519 |
| 2014/0380036 | A1* | 12/2014 | Neumann | ............. | H04L 9/0869 713/150 |

(Continued)

OTHER PUBLICATIONS

Zeidler et al., "AuthStore: Password-based Authentication and Encrypted Data Storage in Untrusted Environments", Aug. 2018, 17th IEEE Conference on Trust, Security and Privacy in Computing and Communications, pp. 996-1001 (Year: 2018).*

(Continued)

*Primary Examiner* — Kenneth W Chang (74) *Attorney, Agent, or Firm* — Edell, Shapiro & Finnan, LLC (57) ABSTRACT

Presented herein are techniques to implement end-to-end encryption. A method includes, encrypting content C with an encryption key EK to obtain encrypted content C', generating a key encrypting key KEK based on a password, encrypting the encryption key EK with the key encrypting key KEK to obtain an encrypted encryption key EK', storing the encrypted content C' and the encrypted encryption key EK' such that the encrypted content C' and the encrypted encryption key EK' are accessible to a content consumer via a link, sending the link and the password to the content consumer, and in response to a request, received via the link, for the encrypted content C' and the encrypted encryption key EK', sending the encrypted content C' and the encrypted encryption key EK' to the consumer based on the content consumer being on an access control list.

20 Claims, 6 Drawing Sheets

(56) References Cited

U.S. PATENT DOCUMENTS

| | | | |
|---|---|---|---|
| 2015/0067327 A1* | 3/2015 | Lipton | H04L 63/083 |
| | | | 713/168 |
| 2015/0106626 A1* | 4/2015 | Kremp | H04L 63/06 |
| | | | 713/189 |
| 2015/0229471 A1 | 8/2015 | Nair et al. | |
| 2015/0318987 A1 | 11/2015 | Kremp et al. | |
| 2015/0381588 A1* | 12/2015 | Huang | G06F 21/6218 |
| | | | 713/153 |
| 2016/0173282 A1* | 6/2016 | Circello | H04L 9/0894 |
| | | | 380/44 |
| 2017/0024551 A1* | 1/2017 | Phadke | H04N 21/2541 |
| 2017/0126642 A1* | 5/2017 | Basin | H04L 9/302 |
| 2017/0149564 A1* | 5/2017 | McCallum | G06F 21/6209 |
| 2020/0195621 A1 | 6/2020 | Li et al. | |
| 2021/0176050 A1 | 6/2021 | Lidzborski et al. | |

OTHER PUBLICATIONS

P. Gutmann, et al., "Password-based Encryption for CMS," Network Working Group, Request for Comments: 3211, Category: Standards Track, Dec. 2001, 17 pages.

* cited by examiner

| PWD1 | GRP1 | PIN1 | email address1 | username1 | telephone number1 |
| PWD1 | GRP1 | PIN2 | email address2 | username2 | telephone number2 |
| PWD2 | GRP2 | PIN3 | email address3 | username3 | telephone number3 |

END-TO-END ENCRYPTION WITH PASSWORD ACCESS

TECHNICAL FIELD

The present disclosure relates to data protection and privacy across a network.

BACKGROUND

Data protection and privacy are paramount when it comes to maintaining customer trust in a product and/or brand. End-to-end encryption (E2EE) is one way to help protect customer data. E2EE is a method of secure communication that prevents third parties from accessing data while the data is transferred from one end of a system or device to another. In E2EE, the data is encrypted on the sender's system or device, and only the intended recipient can decrypt it. As it travels to its destination, and if E2EE is properly implemented, the message cannot be read by an internet service provider (ISP), application service provider, hacker or any other intermediate entity or service.

DESCRIPTION OF EXAMPLE EMBODIMENTS

Overview

Presented herein are techniques to implement end-to-end encryption. A method includes, encrypting content with an encryption key to obtain encrypted content, generating a key encrypting key based on a password, encrypting the encryption key with the key encrypting key to obtain an encrypted encryption key, storing the encrypted content and the encrypted encryption key such that the encrypted content and the encrypted encryption key are accessible to a content consumer via a link, sending the link and the password to the content consumer, and in response to a request, received via the link, for the encrypted content and the encrypted encryption key, sending the encrypted content and the encrypted encryption key to the consumer based on the content consumer being on an access control list.

In another embodiment, a device is provided. The device includes an interface configured to enable network communications, a memory, and one or more processors coupled to the interface and the memory, and configured to: encrypt content with an encryption key to obtain encrypted content, generate a key encrypting key based on a password, encrypt the encryption key with the key encrypting key to obtain an encrypted encryption key, store the encrypted content and the encrypted encryption key such that the encrypted content and the encrypted encryption key are accessible to a content consumer via a universal resource locator, send the link and the password to the content consumer, and in response to a request, via the link, for the encrypted content and the encrypted encryption key, sending the encrypted content and the encrypted encryption key to the consumer based on the content consumer being on an access control list.

In still another embodiment, another method is provided to implement end-to-end encryption. The method includes receiving, from a content owner computing device, a link to access encrypted content, receiving a password from the content owner computing device, obtaining, via the link and from the content owner computing device, the encrypted content and an encrypted encryption key, deriving an encryption key using the password and the encrypted encryption key, and decrypting the encrypted content using the encryption key to obtain unencrypted content.

EXAMPLE EMBODIMENTS

Embodiments described herein provide an approach to achieve a state where content is end-to-end encrypted by default, but where content creators or owners are permitted to share access in a variety of different ways, including sending, to a content consumer, a link (e.g., a universal resource locator (URL)) and password, with which the content consumer can gain access to encrypted content.

The described embodiments operate with both centralized key distribution and encryption tools, like a Key Management System (KMS) and a Hardware Security Module (HSM), and decentralized systems where clients derive their own keys from keying material, as in Message Layer Security (MLS).

The following acronyms and terms are used in detailed description below.

Encryption key (EK)—the key that is to be protected, and that allows content to be decrypted.

Key encrypting key (KEK)—an encryption key that is used to encrypt other keys.

Key bag—a group of keys that are associated with content encrypted via a decentralized key system (e.g., MLS).

Key Management System (KMS)—a service that encrypts and decrypts content or provides encryption keys Messaging Layer Security (MLS)—a system to derive keys based on a group of people. In a meeting this is the roster of participants and their identities.

Password Based Key Derivation Function (PBKDF)—a cryptographically secure algorithm to generate an encryption key from a password.

Oblivious Pseudo Random Function (OPRF)—optional design to include a second party to be involved in a password derivation function to add to brute force protection (i.e., an attacker cannot generate a rainbow table in reasonable time with proper server-side rate limiting).

Figure 1:
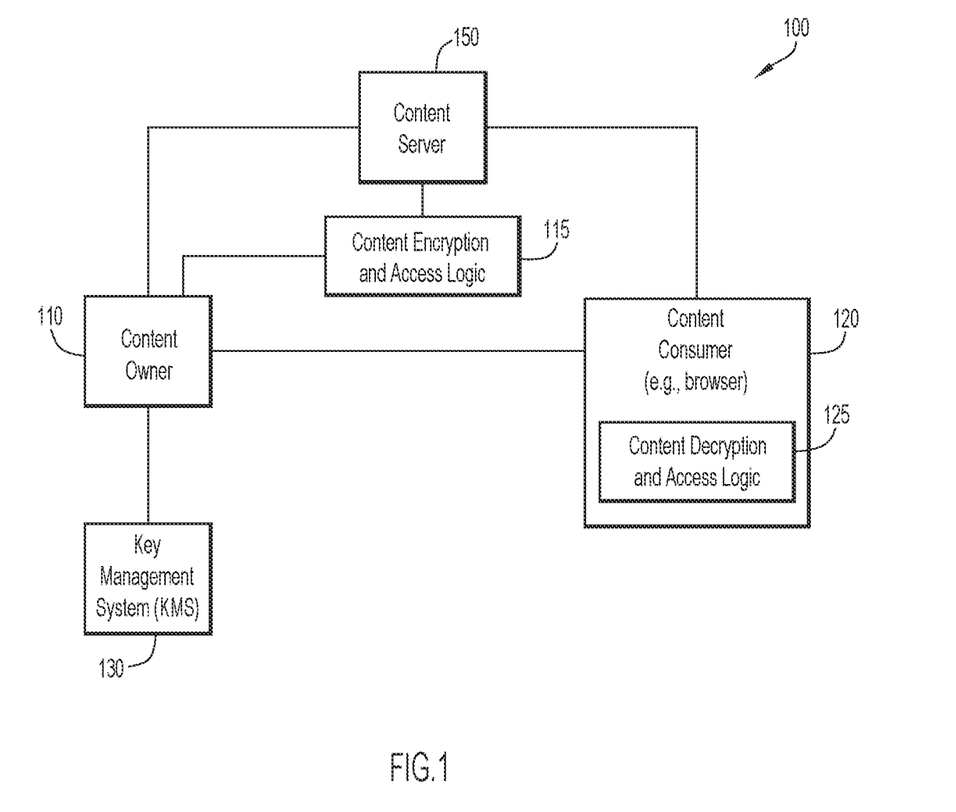
FIG. 1 depicts an end-to-end encryption system including content encryption and access logic, and content decryption and access logic, according to an example embodiment.

FIG. 1 depicts an end-to-end encryption system 100 including content encryption and access logic 115, and content decryption and access logic 125, according to an example embodiment. More specifically, a content owner 110 is connected to a content server 150. A content consumer 120 (e.g., implemented as a web browser) is also connected to content server 150. The foregoing connections may be via a private network, or a public network (e.g., the Internet). Content encryption and access logic 115 may be hosted by one or both of content owner 110 and content server 150. Content decryption and access logic 125 is hosted by content consumer 120. Those skilled in the art will appreciate that content owner 110, content consumer 120, and content server 150 may all be individual computing devices consistent with the computing device described, generally, in connection with FIG. 6.

Also shown in FIG. 1 is KMS 130 which, as will be described more fully below, supplies an encryption key to content owner 110 to encrypt content owned or managed by content owner 110. Resulting encrypted content is ultimately stored on content server 150 for subsequent retrieval by content consumer 120 in accordance with an access control list. The retrieved content is decrypted at content consumer 120, such that unencrypted content (i.e., plaintext) is never stored on content server 150. In this way, end-to-end encryption is achieved between content owner 110 and (an authorized) content consumer 120.

Generating Encrypted Content

Figure 2:
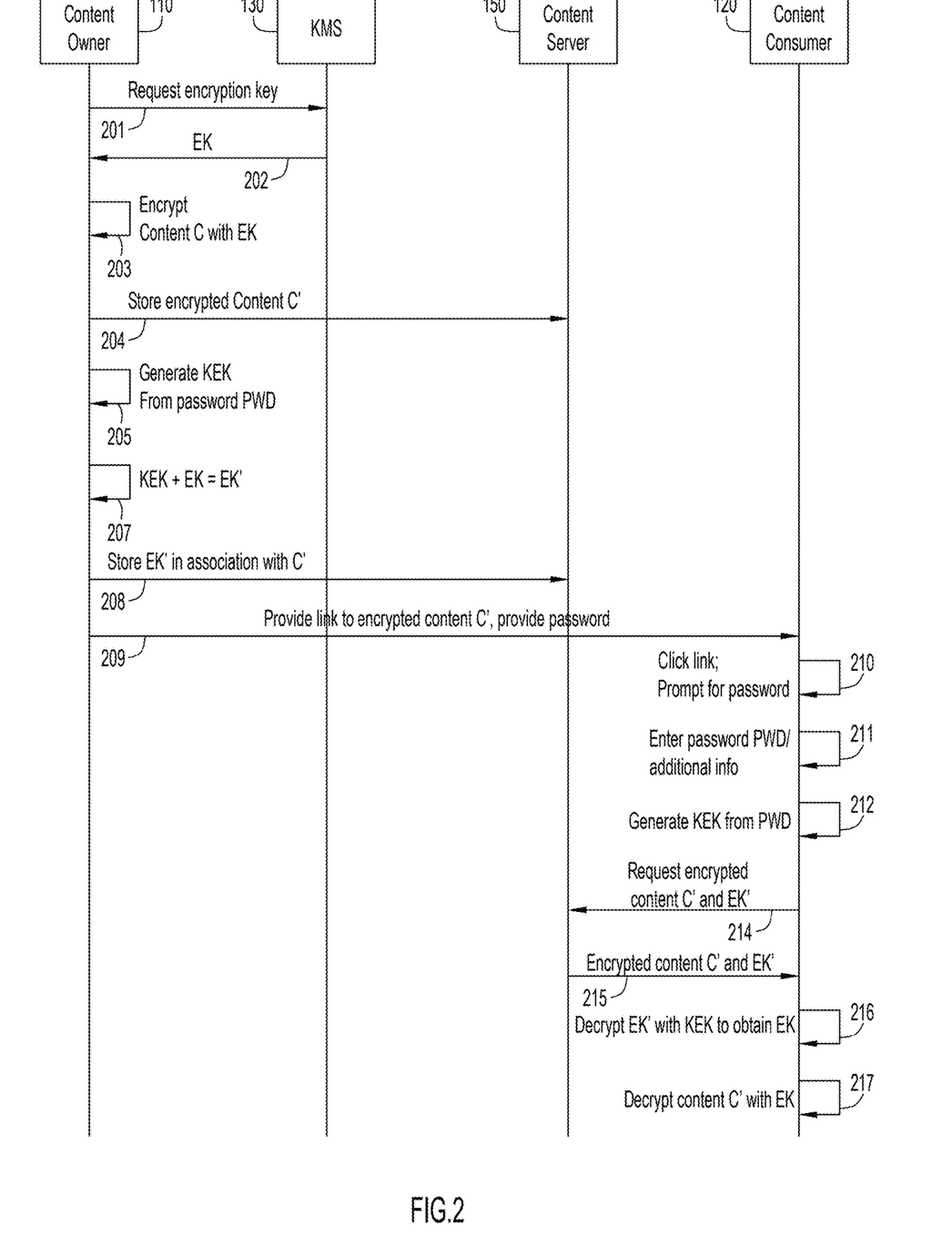
FIG. 2 is a sequence diagram showing several operations that enable end-to-end encryption with password access, in accordance with an example embodiment.

Reference is now made to FIG. 2, which is a sequence diagram showing several operations that enable end-to-end encryption with password access, in accordance with an example embodiment. At 201, content owner 110 (i.e., content encryption and access logic 115) requests an encryption key with which to encrypt content C. At 202, KMS 130 returns an encryption key EK. Using encryption key EK, at 203, content owner 110 encrypts content C, to obtain encrypted content C'. At 204, content owner 110 stores encrypted content C' on content server 150. As such, content C is stored in an encrypted state on content server 150 such that, at this point, only content owner 110 can decrypt the content as encryption key EK has not been shared with other parties.

Adding Password Access to Content

To enable other parties, such as content consumer 120, to gain controlled access to the original content C, content owner 110, at 205, generates a KEK from a password PWD. A Password Based Key Derivation Function (PBKDF) may be used for this operation. In one embodiment the password PWD never "leaves" the content owner 110, i.e., the KEK is generated by content encryption and access logic 115 executed on a computer controlled by content owner 110. That KEK is then, at 207, used to encrypt the encryption key EK to obtain EK' (i.e., KEK+EK=EK'). It is noted that there may be many layers of encryption keys (i.e., Key Encrypting Keys encrypting still other Key Encrypting Keys for increased security). Ultimately, at 208, EK' may be stored alongside the encrypted content C' in content server 150, or in another system with an association to encrypted content C'. In an alternative embodiment, the password PWD is sent to another entity (e.g., KMS 130) to generate the KEK.

Password Access with Recovery

In cases where content owner 110 wants to be able to retrieve the plaintext password PWD, the following additional steps (not shown in the drawings) may be taken to encrypt the password PWD with a separate key that is managed by KMS 130. First, a key is retrieved from KMS 130, and the key is used to encrypt the password PWD to obtain PWD'. PWD' may then be stored alongside encrypted content C' and EK', or in another system with an association to encrypted content C' and EK'.

Password Access Assigned to Individuals (or Groups)

Figure 3:
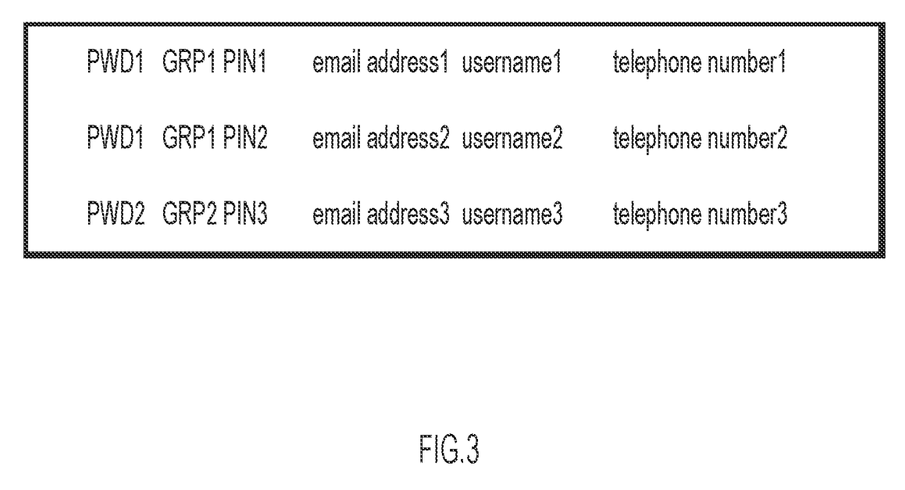
FIG. 3 shows an access control list that might be stored by content encryption and access logic, according to an example embodiment.

In some systems, it may be desirable to assign individual passwords to different content consumers. This can be accomplished with either of the "adding password access to content" or "password access with recovery" options described above. An additional step includes associating additional attributes to the password PWD when it is stored. For example, possible attributes may include email address, user name, phone number or another system identifier (possibly tied to an account) that identifies the authorized content consumer 120. These attributes may be combined with a second security factor, like a personal identification number (PIN) or multi-factor authentication token. In this vein, FIG. 3 shows an access control list that might be stored by content encryption and access logic 115 on a computing device of content owner 110 with some of the attributes mentioned above. To support groups, the same identifier and password can be sent to the group, or every member of the group can be sent an individual set of attributes with an additional attribute of the group. This allows content owner 110 to revoke the group's access in one operation instead of each content consumer 120, one at a time.

Change Password

There may be cases where the content owner 110 may want to change the password PWD. This can be accomplished in one of two ways. First, as in "Password access with recovery," a new password may be encrypted with the original key from KMS 130 used to encrypt the old password, and then stored alongside the encrypted content C' on content server 150, or in some other location, and associated with encrypted content C'. Where content owner 110 desires to use a new key from KMS 130, then that new key would be used to encrypt the password. At this point, the old key and encrypted content C' may be discarded. In the event the password has been changed, then a prior content consumer 120 may no longer be able to access the content, as will be explained further below.

Revocation of Password

To revoke any password that has been associated to the encrypted content C', that password and the associated data and links to the encrypted content C' can be removed from storage in content encryption and access logic 115. That is, the password may be deleted from the access control list of FIG. 3.

Restricting Password Access

Content owner 110 may want to limit access and usage of a given password assigned to an individual content consumer 120 or group. In such a case, content encryption and access logic 115 may be configured to restrict access by time by, e.g., setting a time-to-live (TTL), number of accesses, certain days and/or between specified hours, restricting to a specified IP Address range, geo-fencing, etc.

Accessing Password Protected Content

Reference is again made to FIG. 2. When content owner 110 is ready to permit access to content consumer 120 to content stored on content server 150, content owner 110, at 209, sends to content consumer 120 a link pointing to where the encrypted content C' is stored, and also sends the password PWD as well. At 210, content consumer 120 clicks on the provided link and is prompted for the password PWD. At 211, additional information may be further entered. Such additional information may include further user verification information such as a group number, PIN, email address, username, telephone number, etc., as indicated in FIG. 3. At 212, assuming the provided additional information has been verified, content consumer 120, generates the KEK from the password PWD, i.e., content decryption and access logic 125 executing on a computing device of content consumer 120 uses, e.g., the same PBKDF as content owner to generate the KEK.

At 214, using the previously provided link, content decryption and access logic 125 of content consumer 120 requests the encrypted content C' and the encrypted EK, EK'. At 215, content decryption and access logic 125 of content consumer 120 receives the encrypted content C' and the encrypted EK, EK', and using the KEK generated based on the password, decrypts, at 216, the encrypted encryption key EK' to obtain EK, with which content decryption and access logic 125 of content consumer 120 decrypts, at 217, the encrypted content C', to obtain content C.

Link Based Access

To maintain E2EE, content decryption and access logic 125 of content consumer 120 does not send the password to content server 150, or rely on content server 150 to return keying material. In an embodiment, a link may contain a URL fragment that contains the keying material or password. In another embodiment, the fragment does not contain the plaintext password and may be obfuscated in some way, or after N rounds of the PBKDF function, for better security.

Server-Side Implementation

While it is more secure to maintain end-to-end encryption such that the decryption operations described above are performed by content decryption and access logic 125 of content consumer 120, there may be circumstances where a trusted server may perform those operations (e.g., where the computing device of content consumer 120 is a low-powered device). Such a trusted server could be hosted by content owner 110 or a service provider.

Application to MLS

In an MLS based system, encryption keys are derived from the state of the MLS group (structured as a tree). When the state of the tree changes, so does the key. This is where a key bag is used. A client, e.g., content encryption and access logic 115 executing on content owner 110, can either keep track of all encryption keys, or all MILS messages. After content is generated (e.g., after a video conference meeting is recorded), content encryption and access logic 115 prompts a user for a password, which is used to encrypt the key bag (KB). A resulting encrypted key bag KB' is uploaded to content server 150 and associated to the encrypted content. As such, content server 150, as in the previously described embodiments, never has access to the plaintext content. Variations of this could be that a password is provided at any time and the keys are stored encrypted or uploaded to content server 150 anytime there is a change.

In this scenario, if content owner 110 host loses or forgets the password they used, the data is not recoverable. There could be an implementation where a password hint is stored with the content, but that potentially weakens the security.

Thus, those skilled in the art will appreciate that the embodiments described herein provide methodologies for end-to-end encrypted content to be accessed by a link and a password, while maintaining the properties of end-to-end encryption where a backend (e.g., storage system and/or service provider) does not have access to the plaintext content. It is noted that the content could be any content, such as a recorded meeting as alluded to above, or chat, whiteboard, file, etc.

Figure 4:
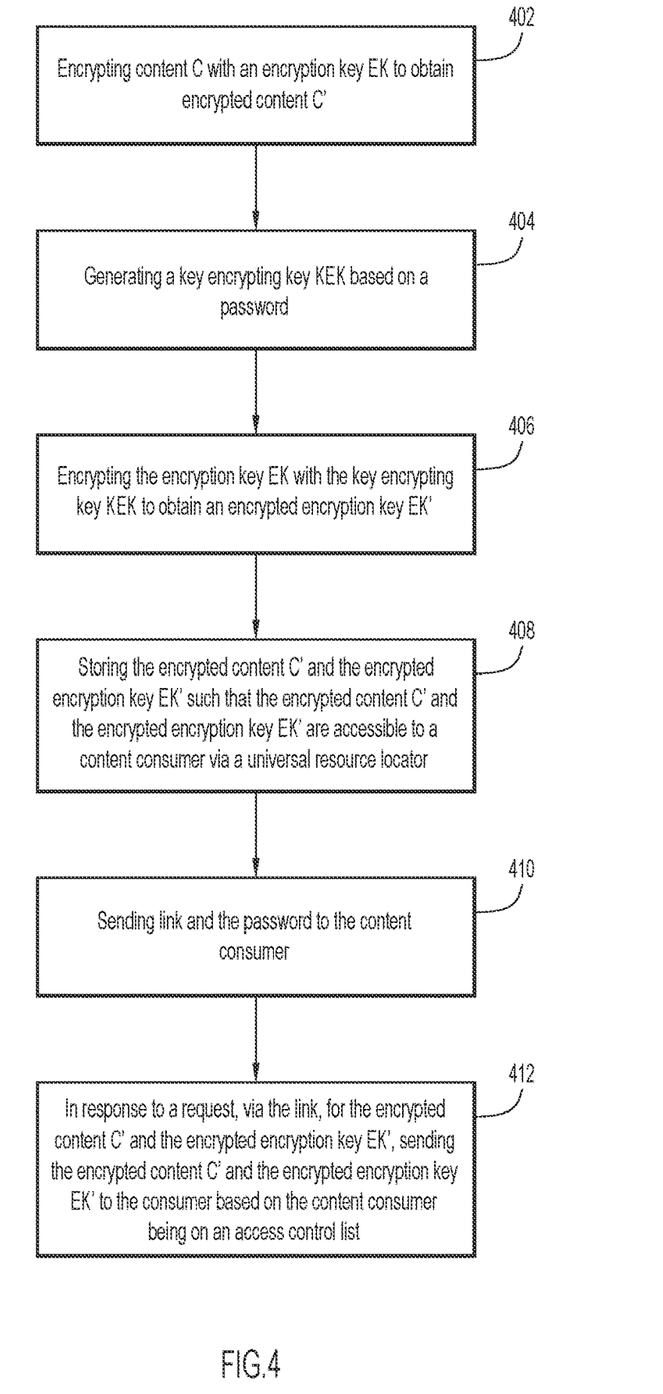
FIG. 4 is a flow chart depicting a series of operations for storing encrypted content and an encrypted encryption key, according to an example embodiment.

FIG. 4 is a flow chart depicting a series of operations for storing encrypted content C' and a password protected encryption key EK', according to an example embodiment. Operations described in connection with FIG. 4 may be performed, for example, by content encryption and access logic 115. Specifically, at 402, content encryption and access logic 115 encrypts content C with an encryption key EK to obtain encrypted content C'. At 404, an operation includes generating a key encrypting key KEK based on a password.

At 406, content encryption and access logic 115 encrypts the encryption key EK with the key encrypting key KEK to obtain an encrypted encryption key EK'. At 408, content encryption and access logic 115 stores the encrypted content C' and the encrypted encryption key EK' such that the encrypted content C' and the encrypted encryption key EK' are accessible to a content consumer via a link (such as a URL). At 410, content encryption and access logic 115 sends (perhaps separately) the link and the password to the content consumer, and at 412, content encryption and access logic 115, in response to a request, received via the link, for the encrypted content C' and the encrypted encryption key EK', sends the encrypted content C' and the encrypted encryption key EK' to the consumer based on the content consumer being on an access control list, such as shown in FIG. 3.

Figure 5:
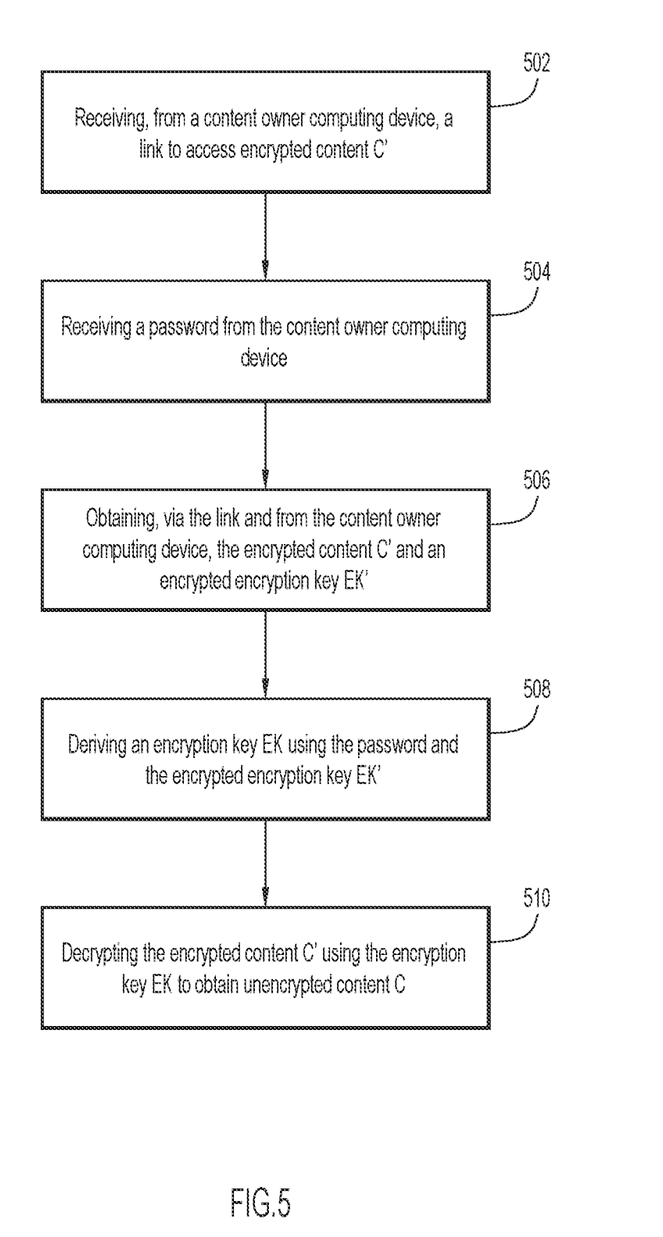
FIG. 5 is a flow chart depicting a series of operations for accessing the encrypted content and the encrypted encryption key, and decrypting the encrypted encryption key using a password, according to an example embodiment.

FIG. 5 is a flow chart depicting a series of operations for accessing encrypted content and decrypting an encrypted encryption key based on a password, according to an example embodiment. Operations described in connection with FIG. 5 may be performed, for example, by content decryption and access logic 125. Specifically, at 502, content decryption and access logic 125 receives, from a content owner computing device, a link to access encrypted content C'. At 504, content decryption and access logic 125 receives a password from the content owner computing device. The link and password may be transmitted in many possible ways including, but not limited to, email, chat, audio, an app feature, hand written note, etc. At 506, content decryption and access logic 125 obtains, via the link and from the content owner computing device, the encrypted content C' and an encrypted encryption key EK'. At 508, content decryption and access logic 125 derives an encryption key EK based on the password and the encrypted encryption key EK'. And, at 510, content decryption and access logic 125 decrypts the encrypted content C' using the encryption key EK to obtain unencrypted content C.

Figure 6:
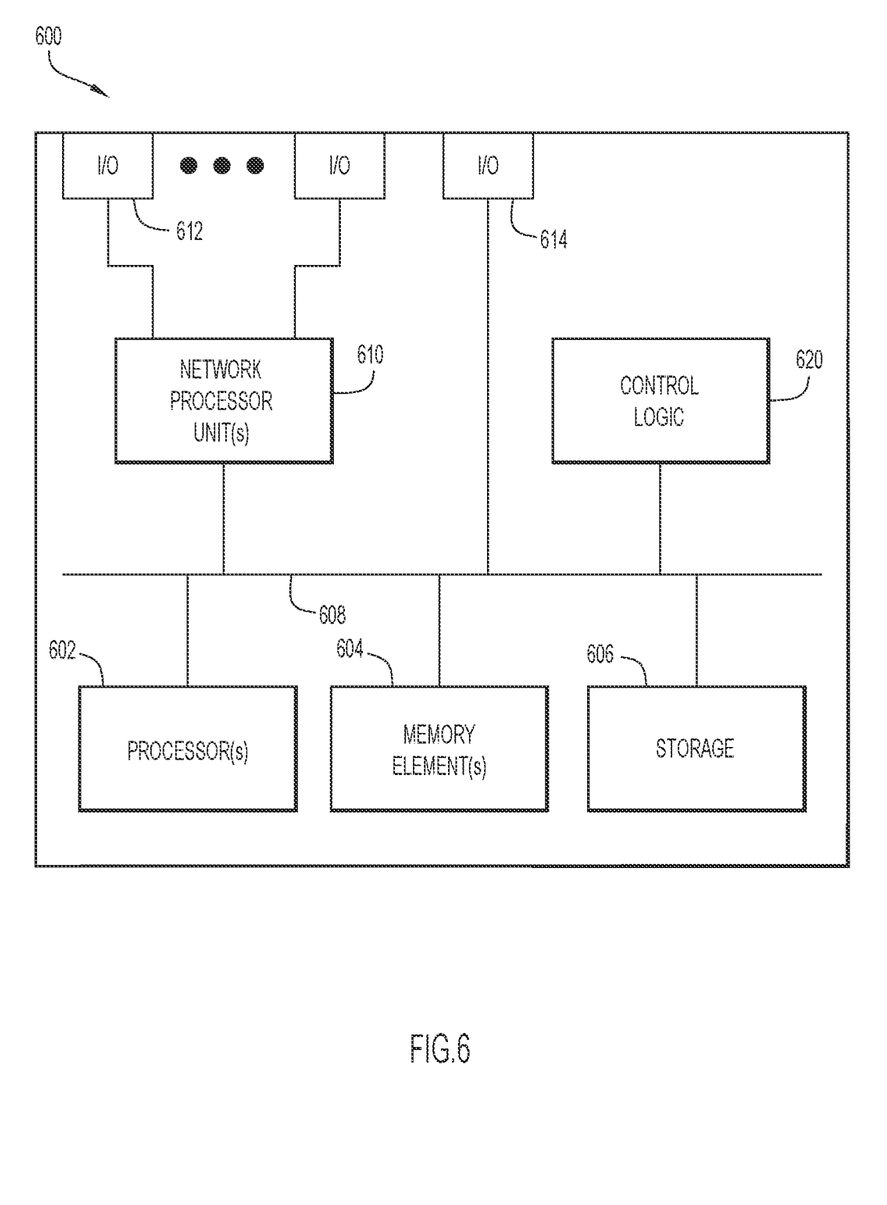
FIG. 6 is a block diagram of a device that may be configured to execute content encryption and access logic and/or content decryption and access logic, and perform the techniques described herein, according to an example embodiment.

FIG. 6 illustrates a hardware block diagram of a computing device 600 that may perform functions associated with operations discussed herein in connection with the techniques depicted in FIGS. 1-5. In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620 (which could include, for example, content encryption and access logic 115 or content decryption and access logic 125). In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, in one embodiment a method is provided. The method may include encrypting content C with an encryption key EK to obtain encrypted content C', generating a key encrypting key KEK based on a password, encrypting the encryption key EK with the key encrypting key KEK to obtain an encrypted encryption key EK', storing the encrypted content C' and the encrypted encryption key EK' such that the encrypted content C' and the encrypted encryption key EK' are accessible to a content consumer via a link, sending the link and the password to the content consumer, and in response to a request, received via the link, for the encrypted content C' and the encrypted encryption key EK', sending the encrypted content C' and the encrypted encryption key EK' to the content consumer based on the content consumer being on an access control list.

The method may further include receiving the encryption key EK from a key management system.

The method may also include generating the key encrypting key KEK by passing the password to a password based key derivation function.

In an embodiment, the key encrypting key KEK may be generated based on multiple key encryption keys.

The method may also include storing the encrypted content C' and the encrypted encryption key EK' together on a content server.

The method may further include storing the encrypted content C' on a content server and storing the encrypted encryption key EK' on a different device but associated with the encrypted content C'.

The method may still further include sending the password separately from the link.

The method may include assigning the password to a group of content consumers.

In an embodiment, the access control list includes at least one of a personal identification number (PIN), an email address, a user name, or a telephone number.

The method may also include encrypting the password with at least one of the encryption key EK or another key.

A device may also be provided. The device may include an interface configured to enable network communications, a memory, and one or more processors coupled to the interface and the memory, and configured to: encrypt content C with an encryption key EK to obtain encrypted content C', generate a key encrypting key KEK based on a password, encrypt the encryption key EK with the key encrypting key KEK to obtain an encrypted encryption key EK', store the encrypted content C' and the encrypted encryption key EK' such that the encrypted content C' and the encrypted encryption key EK' are accessible to a content consumer via a link, send the link and the password to the content consumer, and in response to a request, via the link, for the encrypted content C' and the encrypted encryption key EK', sending the encrypted content C' and the encrypted encryption key EK' to the content consumer based on the content consumer being on an access control list.

The one or more processors may be further configured to receive the encryption key EK from a key management system.

The one or more processors are may be further configured to generate key encrypting key KEK by passing the password to a password based key derivation function.

In an embodiment, the key encrypting key KEK may be generated based on multiple key encryption keys.

The one or more processors may be further configured to store the encrypted content C' and the encrypted encryption key EK' together on a content server.

The one or more processors may be further configured to store the encrypted content C' on a content server and store the encrypted encryption key EK' on a different device but associated with the encrypted content C'.

Another method may also be provided, and may include receiving, from a content owner computing device, a link to access encrypted content C', receiving a password from the content owner computing device, obtaining, via the link and from the content owner computing device, the encrypted content C' and an encrypted encryption key EK', deriving an encryption key EK using the password and the encrypted encryption key EK', and decrypting the encrypted content C' using the encryption key EK to obtain unencrypted content C.

The method may also include sending to the content owner computing device a user identifier in order to receive the link to access encrypted content C'.

The method may further include generating a key encrypting key KEK by passing the password to a password based key derivation function, and using the key encrypting key KEK to decrypt the encrypted encryption key EK' to obtain the encryption key EK.

The method may also include receiving the password separately from the link.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   encrypting content with an encryption key to obtain encrypted content;
   generating a key encrypting key based on a password;
   encrypting the encryption key with the key encrypting key to obtain an encrypted encryption key;
   encrypting the password to obtain an encrypted password;
   storing the encrypted content and the encrypted encryption key such that the encrypted content and the encrypted encryption key are accessible to a content consumer via a link;
   storing the encrypted password along with the encrypted content and the encrypted encryption key;
   retrieving and decrypting the encrypted password to obtain the password;
   sending the link and the password to the content consumer; and
   in response to a request, received via the link, for the encrypted content and the encrypted encryption key, sending the encrypted content and the encrypted encryption key to the content consumer based on the content consumer being on an access control list.

2. The method of claim 1, further comprising receiving the encryption key from a key management system.

3. The method of claim 1, further comprising generating the key encrypting key by passing the password to a password based key derivation function.

4. The method of claim 1, wherein the key encrypting key is generated based on multiple key encryption keys.

5. The method of claim 1, further comprising storing the encrypted content and the encrypted encryption key together on a content server.

6. The method of claim 1, further comprising storing the encrypted content on a content server and storing the encrypted encryption key on a different device but associated with the encrypted content.

7. The method of claim 1, further comprising sending the password separately from the link.

8. The method of claim 1, further comprising assigning the password to a group of content consumers.

9. The method of claim 1, wherein the access control list comprises at least one of a personal identification number (PIN), an email address, a user name, or a telephone number.

10. The method of claim 1, further comprising encrypting the password with at least one of the encryption key or another key.

11. A device comprising:
an interface configured to enable network communications;
a memory; and
one or more processors coupled to the interface and the memory, and configured to:
encrypt content with an encryption key to obtain encrypted content;
generate a key encrypting key based on a password;
encrypt the encryption key with the key encrypting key to obtain an encrypted encryption key;
encrypt the password to obtain an encrypted password;
store the encrypted content and the encrypted encryption key such that the encrypted content and the encrypted encryption key are accessible to a content consumer via a link;
store the encrypted password along with the encrypted content and the encrypted encryption key;
retrieve and decrypt the encrypted password to obtain the password;
send the link and the password to the content consumer; and
in response to a request, via the link, for the encrypted content and the encrypted encryption key, sending the encrypted content and the encrypted encryption key to the content consumer based on the content consumer being on an access control list.

12. The device of claim 11, wherein the one or more processors are further configured to receive the encryption key from a key management system.

13. The device of claim 11, wherein the one or more processors are further configured to generate key encrypting key by passing the password to a password based key derivation function.

14. The device of claim 11, wherein the key encrypting key is generated based on multiple key encryption keys.

15. The device of claim 11, wherein the one or more processors are further configured to store the encrypted content and the encrypted encryption key together on a content server.

16. The device of claim 11, wherein the one or more processors are further configured to store the encrypted content on a content server and store the encrypted encryption key on a different device but associated with the encrypted content.

17. One or more non-transitory computer readable storage media encoded with instructions that, when executed by a processor, cause the processor to:
encrypt content with an encryption key to obtain encrypted content;
generate a key encrypting key based on a password;
encrypt the encryption key with the key encrypting key to obtain an encrypted encryption key;
encrypt the password to obtain an encrypted password;
store the encrypted content and the encrypted encryption key such that the encrypted content and the encrypted encryption key are accessible to a content consumer via a link;
store the encrypted password along with the encrypted content and the encrypted encryption key;
retrieve and decrypt the encrypted password to obtain the password;
send the link and the password to the content consumer; and
in response to a request, via the link, for the encrypted content and the encrypted encryption key, sending the encrypted content and the encrypted encryption key to the content consumer based on the content consumer being on an access control list.

18. The one or more non-transitory computer readable storage media of claim 17, wherein the instructions are further configured to receive the encryption key from a key management system.

19. The one or more non-transitory computer readable storage media of claim 17, wherein the instructions are further configured to generate the key encrypting key by passing the password to a password based key derivation function.

20. The one or more non-transitory computer readable storage media of claim 17, wherein the key encrypting key is generated based on multiple key encryption keys.

* * * * *